US008078808B2

(12) United States Patent  
Becker (10) Patent No.: US 8,078,808 B2
(45) Date of Patent: Dec. 13, 2011

(54) METHOD AND DEVICE FOR MANAGING A MEMORY FOR BUFFER-STORING DATA BLOCKS IN ARQ TRANSMISSION SYSTEMS

(75) Inventor: Burkhard Becker, Ismaning (DE)

(73) Assignee: Infineon Technologies AG (DE)

( * ) Notice: Subject to any disclaimer, the term of this patent is extended or adjusted under 35 U.S.C. 154(b) by 1907 days.

(21) Appl. No.: 10/975,760

(22) Filed: Oct. 28, 2004

(65) Prior Publication Data

US 2005/0094878 A1   May 5, 2005

Related U.S. Application Data

(63) Continuation of application No. PCT/DE03/01170, filed on Apr. 9, 2003.

(30) Foreign Application Priority Data

Apr. 29, 2003  (DE) ................................ 102 19 099

(51) Int. Cl.
  G06F 12/00    (2006.01)
  G06F 13/00    (2006.01)
  G06F 13/28    (2006.01)

(52) U.S. Cl. ........................................ 711/154; 714/751
(58) Field of Classification Search .................. 714/751; 711/154
  See application file for complete search history.

(56) References Cited

U.S. PATENT DOCUMENTS

| 5,657,325 | A | * | 8/1997 | Lou et al. ........................ 370/334 |
| 5,968,198 | A | * | 10/1999 | Hassan et al. ................... 714/752 |
| 6,704,898 | B1 | * | 3/2004 | Furuskar et al. ............... 714/751 |
| 2004/0123212 | A1 | * | 6/2004 | Chang et al. ................... 714/751 |

FOREIGN PATENT DOCUMENTS

| EP | 0 771 092 A1 | 10/1995 |
| EP | 0 937 337 B1 | 8/1999 |
| EP | 0 966 124-42 | 12/1999 |
| EP | 1 168 702 A1 | 6/2000 |
| EP | 1 168 703 A2 | 6/2001 |
| JP | 2000-004215 A | 1/2000 |
| JP | 2002-084213 A | 3/2002 |
| WO | WO-00/05911 A1 | 2/2000 |
| WO | WO-01/20837 A1 | 3/2001 |
| WO | WO 01/43331 A1 | 6/2001 |

OTHER PUBLICATIONS

Technical Specification 3GPP TS 43.064 V4.1.0 (Apr. 2001), 3rd Generation Partnership Project; Chapter 6.5.5.
S. Kallel, et al.; "An Adaptive Hybrid ARQ Scheme"; Wireless Personal Communications; Kluwer Academic Publishers, NL, vol. 12, No. 3; pp. 297-311, Mar. 2000.
R. Zarits, "Datenbeschleuniger fur Mobilfunk-Netze"; Funkschau No. 46, pp. 46-48, Oct. 2001.
Kallel, Samir; "Complementary Punctured Convolutional (CPC) Codes and Their Use in Hybrid ARQ Schemes"; Dept. of Electrical Engineering, The University of British Columbia, Vancouver, B.C. Canada, V6T-1Z4.

* cited by examiner

*Primary Examiner* — Sheng-Jen Tsai
(74) *Attorney, Agent, or Firm* — Dickstein Shapiro LLP (57) ABSTRACT

A data block to be transmitted to a receiver is subjected to channel coding and puncturing in a transmitter. For the purpose of managing data block versions obtained from repeat transmissions of this data block in the receiver, a memory area is provided for storing received data block versions in punctured form. A decision is made regarding whether or not a received data block version for a data block whose decoding in the receiver has failed to date is stored in the memory area.

24 Claims, 5 Drawing Sheets

METHOD AND DEVICE FOR MANAGING A MEMORY FOR BUFFER-STORING DATA BLOCKS IN ARQ TRANSMISSION SYSTEMS

CROSS-REFERENCE TO RELATED APPLICATION

This application is a continuation of copending International Application No. PCT/DE03/01170 filed Apr. 9, 2003 which designates the United States, and claims priority to German application no. 102 19 099.2 filed Apr. 29, 2002.

TECHNICAL FIELD OF THE INVENTION

The present invention relates to a method and an apparatus for managing data block versions obtained from repeat transmissions of a data block which is to be decoded in a receiver.

DESCRIPTION OF RELATED ART AND BACKGROUND OF THE INVENTION

When transmitting data via a channel which is subject to interference, attempts are made to achieve the highest possible degree of accuracy for the received data in the receiver with as little complexity as possible. There are two complementary approaches to achieving this goal: a first approach involves using suitable measures such as channel coding and interleaving to make the signal which is to be transmitted so transmittable that there is a high probability of success in decoding the signal even when a channel is subject to interference. With this approach, prior to transmission of the signal, the signal has redundancy added to it which allows low-error decoding of the received signal in the receiver. The second approach involves checking the received data for accuracy in the receiver and, if transmission errors have arisen, requesting a repeat transmission of the data. The repeat request for incorrectly transmitted data packets is known as the ARQ (Automatic Repeat Request) method.

Hybrid ARQ methods, called H-ARQ, have been found to be particularly effective. In H-ARQ methods, data blocks whose transmission has failed are not rejected but rather are buffer-stored in the receiver and are combined in appropriate fashion with the data block version which arrives in the receiver when the data block is next transmitted. H-ARQ methods make use of the fact that even data blocks which have been transmitted incorrectly can still contribute to obtaining information during the decoding.

In H-ARQ methods, it is already known practice to make a repeat transmission of a data block more immune to interference than the first transmission. This is achieved by adding more or a different type of redundancy during the repeat transmission of a data block than during the first transmission of this data block. The aim is to execute the repeat transmission such that decoding is possible in combination with previously transmitted data block versions. This measure is referred to as IR (Incremental Redundancy). In practice, a different modulation or channel coding scheme is used and/or a different puncturing pattern is used during the repeat transmission of a data block than during the first transmission of the data block.

A drawback of H-ARQ methods is that erroneous data block versions need to be buffer-stored in the receiver until the data block forming the basis of the erroneous data block versions at the transmitter end is successfully decoded. This requires a memory space involvement in the receiver.

The article "Datenbeschleuniger für Mobilfunk-Netze" [data accelerator for mobile radio networks], by R. Zarits, Funkschau No. 46, 10/2001, pages 46 to 48, describes the use of IR in combination with the EGPRS (Enhanced General Packet Radio Services) standard. The EGPRS standard is based on EDGE (Enhanced Data Rates for GSM Evolution)—a further development of the GSM (Global System for Mobile Communication) standard—and GPRS (General Packet Radio Services), the packet-oriented transmission of useful data in GSM. EGPRS uses nine different modulation and channel coding schemes (referred to as MSC-1 to MCS-9) and three or two puncturing patterns (referred to as P1 to P3). Puncturing patterns e.g. for MCS-9 (P1, P2, P3) reduce the data rate by the factor 3, i.e. only one bit out of three bits prior to puncturing remains after puncturing on average over time. The modulation and coding schemes MCS-1 to MCS-9 and the puncturing are described in section 6.5.5 of the standard 3GPP TS 43.064 V4.1.0 (2001-04).

Figure 1:
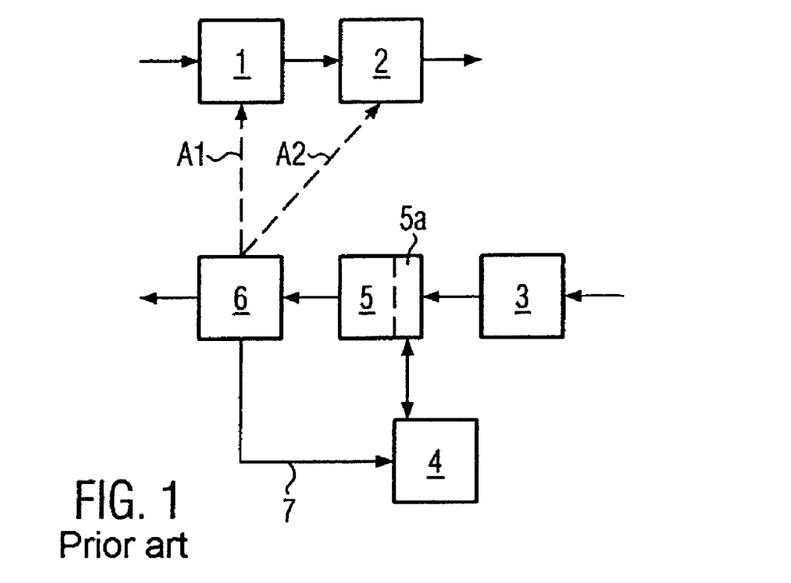
FIG. 1 shows a schematic illustration of a transmitter and receiver structure for H-ARQ with an IR memory based on the prior art.

For EGPRS, the following procedure explained in connection with FIG. 1 has already been proposed by ARQ: in a transmitter, FIG. 1 shows only the channel coder 1 and a puncturer 2. At the receiver end, FIG. 1 shows a depuncturer 3, an IR memory 4, a channel decoder 5 with an upstream combiner 5a, and an error detector 6. When a data block is transmitted, the data block is channel coded by the channel coder 1 and is punctured in the puncturer 2. After modulation (not shown), the channel coded, punctured data block is transmitted via the transmission channel (air interface) and is received by the receiver. The data block version arriving at the receiver is depunctured by the depuncturer 3 (i.e. the bits removed during puncturing at the transmitter end are added again as zeros) and is decoded by the channel decoder 5. If channel decoding fails, this is identified by the error detector 6. The depunctured data block version is then buffer-stored in the IR memory 4 (the appropriate instruction is given via the control connection 7), and the data block is transmitted again in line with the usual ARQ procedure. As indicated by the arrows A1, A2, a different modulation and coding scheme and a different puncturing pattern may be used during the second transmission of the data block than during the first transmission. The subsequently received second data block version is depunctured in the depuncturer 3, is combined with the depunctured first data block version in the combiner 5a, and the depunctured and combined data block version is decoded once again by the channel decoder 5. If the decoding fails again, the depunctured and combined data block version is stored in the IR memory 4 by overwriting the first data block version stored therein, and a third transmission of the data block is requested at the transmitter. The method is continued until the data block has been successfully decoded.

The method for storing depunctured data block versions which is described with reference to FIG. 1 has the advantage that relatively simple memory management is made possible, since only a single depunctured data block version (either the first depunctured data block version received or the depunctured and combined data block version) ever needs to be stored for each undecodable data block. However, a drawback is that this method does not always deliver optimum decoding results and also—particularly in the case of heavy puncturing—has a relatively large memory space requirement. In particular, versions are combined which may have experienced extremely different propagation conditions, which means that the combined version can be decoded to a poorer extent in border cases than the version which manages without combination with extremely poorly transmitted versions. In addition, in a manner which is arithmetically dependent on the combination (when numbers are added the word length of the binary representation increases), a longer word length needs to be made available to the blocks which are to be stored.

SUMMARY OF THE INVENTION

It is an object of the present invention to provide a method for managing data block versions obtained from repeat transmissions of a data block which is to be decoded in a receiver, which method permits powerful decoding with low memory space requirement. In particular, the method needs to be able to be used advantageously when transmission conditions are poor or are fluctuating greatly. The invention is also based on the object of providing an apparatus having the advantages mentioned.

This object can be achieved by a method for managing data block versions obtained from repeat transmissions of a data block which is to be decoded in a receiver, the data block to be transmitted being subjected to channel coding and puncturing in the transmitter, comprising the steps of providing a memory area for storing received data block versions in punctured form; and making a decision regarding whether or not a received data block version for a data block whose decoding in the receiver has failed to date and is also unsuccessful when the currently received data block version is taken into account is stored as a punctured data block version in the memory area.

Data block versions stored in the memory area for the same data block can be channel coded using a different channel code and/or can be punctured using a different puncturing pattern. The decision to be made regarding the storage or nonstorage of a received data block version can be made on the basis of management information which is held in the receiver for the punctured data block versions stored in the memory area, the management information comprising information about the quality of a stored data block version. The management information also may comprise information for referencing further stored data block versions for the same data block. The management information also may comprise information which indicates the channel code used and/or the puncturing pattern used. The management information also may comprise information which indicates the data block to which the stored data block version can be attributed. Storing a received data block version may involve overwriting an already stored data block version, the stored data block version to be overwritten being chosen on the basis of the management information. The method may further comprise the steps of storing a received data block version if free memory space is available; otherwise making a decision regarding whether the received data block version can be stored by over-writing a data block version of the same data block; if this is not possible, making a decision regarding whether the received data block version can be stored by over-writing a data block version of a different data block; otherwise rejecting the received data block version. No more than a particular prescribed number of received punctured data block versions, particularly two, can be stored on average over time for each data block. The quality of the currently received data block version can be determined, and a stored data block version can be over-written by a currently received data block version associated with the same data block only if a comparison between the quality of the received data block version and the quality of the stored data block version reveals that the quality of the currently received data block version is a prescribed differential better than the quality of the stored data block version. The differential may assume a first prescribed difference value if the received data block version and the stored data block version have been punctured using the same puncturing pattern, the differential may assume a second prescribed difference value if the received data block version and the stored data block version have been punctured using different puncturing patterns, and the second prescribed difference value can be greater than the first prescribed difference value. The quality of the currently received data block version can be determined, and a stored data block version of a first data block can be overwritten by the currently received data block version associated with a different, second data block only if: more data block versions are stored for the first data block than for the second data block; the first data block has a plurality of data block versions having one and the same puncturing pattern Px, which is different, in particular, than the puncturing pattern of the received data block version; and the quality of the currently received data block version is a prescribed third differential better than the quality of a stored data block version having the puncturing pattern Px. The first data block selected can be that data block for which most data block versions are stored in the memory area, and this first data block's stored data block version to be overwritten which is selected can be that data block version punctured using the puncturing pattern Px which has the poorest quality. The method can be used for transmitting data blocks based on the EGPRS standard.

The object can also be achieved by an apparatus for managing data block versions obtained from repeat transmissions of a data block which is to be decoded in a receiver, the data block to be transmitted being subjected to channel coding and puncturing in the transmitter, comprising a memory area for storing received data block versions in punctured form, and a decision logic unit for deciding whether or not a received data block version for a data block whose decoding in the receiver has failed to date and is also unsuccessful when the currently received data block version is taken into account is stored as punctured data block version in the memory area.

Data block versions stored in the memory area for the same data block can be channel coded using a different channel code and/or can be punctured using a different puncturing pattern. The apparatus may further comprise a management information table which is associated with the memory area and contains management information for each stored punctured data block version, the table comprising an entry for information about the quality of the data block version. The management information table also may comprise an entry for information for referencing further stored data block versions for the same data block. The management information table also may comprise an entry for information which indicates the channel code used and/or the puncturing pattern used. The management information table also may comprise an entry for information which indicates the data block to which the stored data block version can be attributed. The decision logic unit may access entries in the management information table and makes its decision on the basis of the management information obtained. The decision logic unit may decide to store a received data block version in a free memory space if such a memory space is available, otherwise it decides whether the received data block version is to be stored by overwriting a data block version of the same data block, and if the result of this decision is negative it decides whether the received data block version can be stored by overwriting a data block version of a different data block, with a decision being made to reject the received data block version if the result of this decision is also negative. The size of the memory area can be chosen such that no more than a particular prescribed number of received punctured data block versions, particularly two, can be stored for each data block on average over time. The decision logic unit may comprise: a means for selecting a stored data block version, a means for calculating a quality difference between the quality of the currently received data block version and the quality of the selected stored data block version, which is taken from the management information table, and a means for assessing the quality difference.

In the inventive method for managing data block versions obtained from repeat transmissions of a data block which is to be decoded in a receiver, where the data block to be transmitted is subjected to channel coding and puncturing in the transmitter, a memory area is provided for storing received data block versions in punctured form. When a new data block version of a data block is received whose decoding in the receiver has failed to date and if the decoding after combination with the newly received data block version also fails, a decision needs to be made regarding whether or not this data block version is stored as a punctured data block version in the memory area.

By storing punctured data block versions instead of depunctured data block versions, it is possible to achieve a reduction in the size of the memory area required for IR, specifically because the size of a punctured data block version may be significantly smaller than the size of the depunctured data block version. By way of example, in EGPRS, the size of a depunctured data block in the case of MCS-9 corresponds to the size of three punctured data blocks. In this respect, in the case of the inventive method, after the first failed decoding attempt only a third of the memory size which needs to be involved in the conventional method for storing the depunctured data block version is required. If two versions of the data block to be transmitted are sufficient to perform successful decoding, the memory area required is still 33% less than in the case of the conventional method.

Since, in cases with moderate transmission conditions, one to two buffer-stored data block versions (relating to the same data block to be transmitted) normally suffice to ensure a bit error rate which meets the demands after decoding, on average between $\frac{1}{3}$ and $\frac{2}{3}$ of the memory area can be saved in comparison with the conventional method when storing the depunctured and (possibly) combined data block version.

A further advantage of the inventive method is that the decision regarding whether or not a data block version is permitted to be stored in the memory area and hence to be subsequently combined, can be taken as a basis for excluding data block versions having particularly poor transmission properties from the further processing. It is thus possible to ensure that only data block versions which make a positive contribution to the performance during channel decoding are permitted to be combined. The effect achieved by this is that data block versions which would impair the decoding power when combined with the previously received data block versions on account of their poor transmission characteristic can be ignored in the method based on the invention—unlike in the case of the prior art where repeat transmissions involve each incoming data block version being taken into account through combination with the depunctured (and possibly also already combined) data block version which is available at this time.

However, the inventive method also has drawbacks over the prior art: since punctured data block versions are buffer-stored, the buffer-stored data block versions first still need to be depunctured prior to every combination. In addition, the inventive method may require more complex memory management in order to prevent incoming data block versions of poor quality from causing the memory area to overflow. In many cases, the advantages described (lower memory space requirement and higher decoding power) outweigh these drawbacks, however.

One particularly preferred variant embodiment of the invention is characterized in that data block versions stored in the memory area for the same data block can be channel coded using a different channel code and/or can be punctured using a different puncturing pattern. The effect achieved by this measure used in IR is that the received data block versions which can be attributed to one and the same data block comprise a different amount of redundancy and/or (by virtue of different puncturing) a different representation of the information contained.

One particularly preferred variant embodiment of the inventive method is characterized in that each punctured data block version stored in the memory area has management information held in the receiver, said information comprising information about the quality of the data block version. This quality statement can be used to compare the quality of an incoming data block version with the quality or qualities of the data block version(s) already stored and, on the basis of this comparison, to decide whether the currently received data block version needs to be stored or rejected.

For this purpose, the management information advantageously also comprises information for referencing further stored data block versions for the same data block. This permits the quality entries for the stored data block versions to be associated with the individual data blocks.

Further measures permitting more detailed management of stored data block versions and increasing the size of the parameter set which is taken as a basis for making the decision to store or not to store a data block version in the memory area involve the management information comprising information which indicates the channel code used and/or the puncturing pattern used for the data block versions stored in the memory area.

Preferably, the inventive method is carried out on the basis of the following steps: if free memory space is available in the memory area, a received data block version is stored there. Otherwise, a decision is made regarding whether the received data block version can be stored by overwriting a data block version of the same data block. If this is not possible, a decision is made regarding whether the received data block version can be stored by overwriting a data block version of a different data block. If this is not possible either, the received data block version is rejected. It will be pointed out that this implementation of the method also permits data block versions which cannot be attributed to the data block in the currently received data block version to be overwritten.

Preferably, a stored data block version is overwritten by a currently received data block version which is associated with the same data block as the stored data block version only if a comparison between the quality of the currently received data block version and the quality of the stored data block version reveals that the quality of the currently received data block version is a prescribed differential better than the quality of the stored data block version. The effect achieved by this is that data block versions can be overwritten only by data block versions of better quality.

With particular advantage, differentiation is performed according to whether or not the data block version which is to be overwritten has been punctured using the same puncturing pattern as the currently received data block version. Consequently, one advantageous measure is characterized in that the differential assumes a first prescribed difference value if the received data block version and the stored data block version have been punctured using the same puncturing pattern, in that the differential assumes a second prescribed difference value if the received data block version and the stored data block version have been punctured using different puncturing patterns, and in that the second prescribed difference value is greater than the first prescribed difference value. This takes into account the fact that the information obtained when combining data block versions having different puncturing patterns is much more than the information obtained when combining data block versions having the same puncturing patterns. Furthermore, the first and second prescribed difference values may be dependent on the coding schemes and/or puncturing patterns used.

Preferably, a stored data block version of a first data block can be overwritten by a currently received data block version associated with a different, second data block only if more data block versions are stored for the first data block than for the second data block, the first data block has a plurality of data block versions having one and the same puncturing pattern Px, and the quality of the currently received data block version is a prescribed differential of a third difference value better than the quality of the stored data block version. This practice ensures that data block versions for other data blocks are overwritten only if this does not bring about any serious loss of information for decoding the other data block.

The inventive apparatus for managing data block versions obtained from repeat transmissions of a data block which is to be decoded in a receiver comprises a memory area for storing received data block versions in punctured form and a decision logic unit for deciding whether or not a received data block version for a data block whose decoding in the receiver has failed to date and is also unsuccessful when the currently received data block version is taken into account is stored as a punctured data block version in the memory area.

Preferably, the apparatus comprises a management information table which is associated with the memory area and contains management information for each stored punctured data block version, the table comprising an entry for information about the quality of the data block version, and the decision logic unit accesses entries in the management information table and makes its decision on the basis of the management information obtained. By managing the memory area using the decision logic unit and the management information table, there is the possibility of specifically rejecting currently received data block versions or permitting them to be combined and of overwriting data block versions which are already stored. This firstly allows the memory space requirement to be minimized and secondly allows the decoding power to be improved.

BRIEF DESCRIPTION OF THE DRAWINGS

The invention is illustrated below using an exemplary embodiment with reference to the drawing, in which.

DETAILED DESCRIPTION OF EMBODIMENTS

In the text below, the term "data block" is used to denote the transmitter-end RLC (Radio Link Control) data block, i.e. a data block which is defined in the data link layer (RLC layer) of the OSI reference model. An RLC data block is unaffected by the processing steps carried out in the MAC (Medium Access Control) layer which is underneath, such as channel coding, puncturing and modulation.

Figure 2:
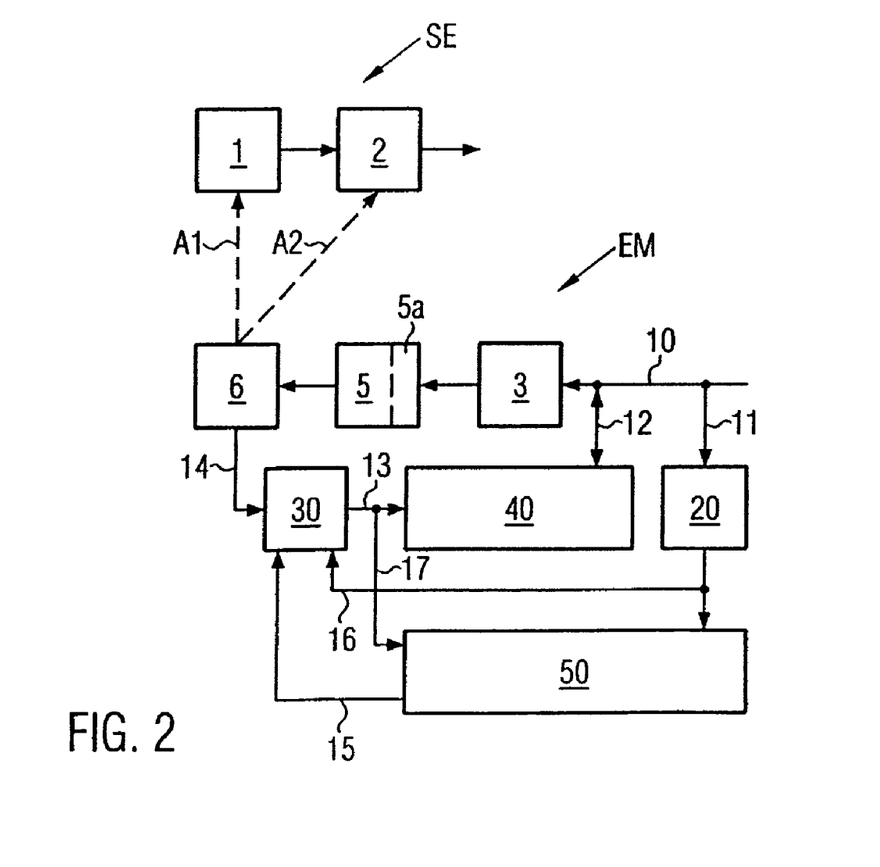
FIG. 2 shows a schematic illustration of a transmitter and receiver structure for H-ARQ with an inventive apparatus for managing an IR memory.

FIG. 2 uses the example of EGPRS to explain the inventive transmission-end and reception-end data processing for an H-ARQ method in the case of IR. The same or comparable functional elements as in FIG. 1 have been denoted using the same reference symbols. The data processing in the transmitter SE takes place, as already explained in FIG. 1, using the channel coder 1, the puncturer 2 and a modulator (not shown). The nine modulation and coding schemes MCS-1, MCS-2, . . . MCS-9 achieve data rates of between 8.8 kbit/s and 59.2 kbit/s per time slot, the schemes MCS-5 to MCS-9 using an 8-PSK (Phase Shift Keying) method, while the schemes MCS-1 to MCS-4 use 8-PSK and GMSK (Gaussian Minimum Shift Keying) modulation.

At the receiver EM, the data block versions transmitted via the transmission channel are supplied to the depuncturer 3 via the data connection 10 after digitization and equalization (not shown). At the same time, the received data block versions are available to an IR memory 40 via a data connection 12 and may, if appropriate, be supplied to a unit 20 for estimating the quality of a data block version via a data connection 11. The IR memory 40 is designed in the manner of a FIFO (First In First Out) structure.

The error detector 6 is connected to the input of a logic unit 30 via a data connection 14. In addition, the logic unit 30 is connected to a management information table memory 50 via a data connection 15 and is connected to the output of the unit 20 for estimating the quality of a data block version via a data connection 16. An output on the logic unit 30 is connected to a read/write input and to the address input of the IR memory 40 via a data connection 13. The data connection 17 is also used to communicate this information to the management information table memory 50.

It will be pointed out that the design shown in FIG. 2 is of conceptional nature and, in terms of hardware, may be produced in an entirely different form than that shown in FIG. 2. All process steps to be described below may be carried out, by way of example, in a processor on the basis of a suitable data processing program, or it is also possible to implement some of these steps, e.g. the depuncturing in the depuncturer 3 and/or the decoding in the channel decoder 5, at least to some extent in hardware (i.e. using hardwired circuits). In addition, it will be pointed out that buffer memories for the temporary storage of data block versions are not shown in FIG. 2.

The functionality of the circuit concept shown in FIG. 2 is as follows:

What can be seen is the transmission of a particular RLC data block. During the first transmission attempt, this data block is channel coded on the basis of a particular modulation and channel coding scheme MCS-1, . . . , MCS-9, is punctured using a particular puncturing pattern P1, P2, P3, is modulated and is transmitted to the receiver EM. The data block version arriving at the latter is buffer-stored (not shown), is depunctured in the depuncturer 3 and is decoded in the channel decoder 5. If the error detector 6 subsequently establishes that the data received are sufficiently accurate, the process ends and the transmitted RLC data block has been successfully decoded in the receiver. Otherwise, H-ARQ is used to request the repeat transmission of the data block, in which case a different coding scheme MCS-1, . . . , MCS-9 and/or a different puncturing pattern P1, P2, P3 can be used at the transmitter end, as already mentioned. In addition, a check is carried out to determine whether the first version of the data block, which is held (not shown) in a buffer memory, needs to be buffer-stored in the IR memory 40. For this purpose, the unit 20 ascertains a quality value which is meaningful for the quality of this data block version or for the transmission channel. The quality value may be calculated, by way of example, from the soft output values of the equalizer connected upstream in the signal path. The equalized data bits and the soft output values calculated by the equalizer for these data bits are then communicated to the unit 20. In the EGPRS standard, a data block comprises four individual bursts. One option for ascertaining the quality value involves the unit 20 ascertaining the distribution of the soft output values for each burst using a, by way of example, 16-value histogram. As a quality measure for each received data block version, the histograms for the four cohesive bursts are added and are convoluted with a firmly prescribed 16-value reference value. Since soft output values are a measure of the confidence of a decided data bit (value 0 or 1), the quality value calculated in this manner reflects the respective transfer characteristics of the channel. Other options for calculating the quality value for a data block version using the unit 20 are also conceivable, however.

If the data connection 14 is used to notify the logic unit 30 that the decoding of the first data block version has failed, the logic unit thus needs to decide whether or not the buffer-stored first data block version needs to be stored in the IR memory 40. To this end, the logic unit 30 uses the data connection 16 to resort to the quality value calculated in the unit 20 and uses the data connection 15 to resort to the management information stored in the management information table memory 50 for the IR memory 40. On the basis of this information, the logic unit 30 makes its decision and communicates this decision via the data connections 13 and 17 to the IR memory 40 and to the management information table memory 50. In most cases, the undecodable first data block version will be stored in the IR memory 40, with write access via the data connection 12 being illustrated.

Provision may also be made for a received first data block version always to be stored in the IR memory 40.

When the second data block version arrives, the first, stored data block version is read from the IR memory 40 and is depunctured by the depuncturer 3. The second data block version is likewise depunctured by the depuncturer 3. The two depunctured data block versions are then combined in the combiner 5a. For this, different combination methods may be used, e.g. the two depunctured data words are added in a weighting based on the soft bit values. Next, the combined data block version is channel decoded in the channel decoder 5 and the decoding result is assessed using the error detector 6.

If the second decoding attempt was also unsuccessful, a further transmission of the RLC data block is ordered and at the same time the redundancy information managed in the receiver's IR memory 40 is updated. In this case, the logic unit 30 decides in the manner already described, i.e. taking into account the quality value of the second data block version and the management information, whether the second data block version is rejected or is stored in the IR memory 40.

It will be pointed out that the data block versions obtained from the transmissions are always stored separately and in punctured form in the IR memory 40.

The process described is repeated until the data block has been decoded properly. It goes without saying that other data blocks are transmitted between the repeat transmissions of the RLC data block in question, which means that the IR memory 40 buffer-stores data block versions for different data blocks.

Figure 3:
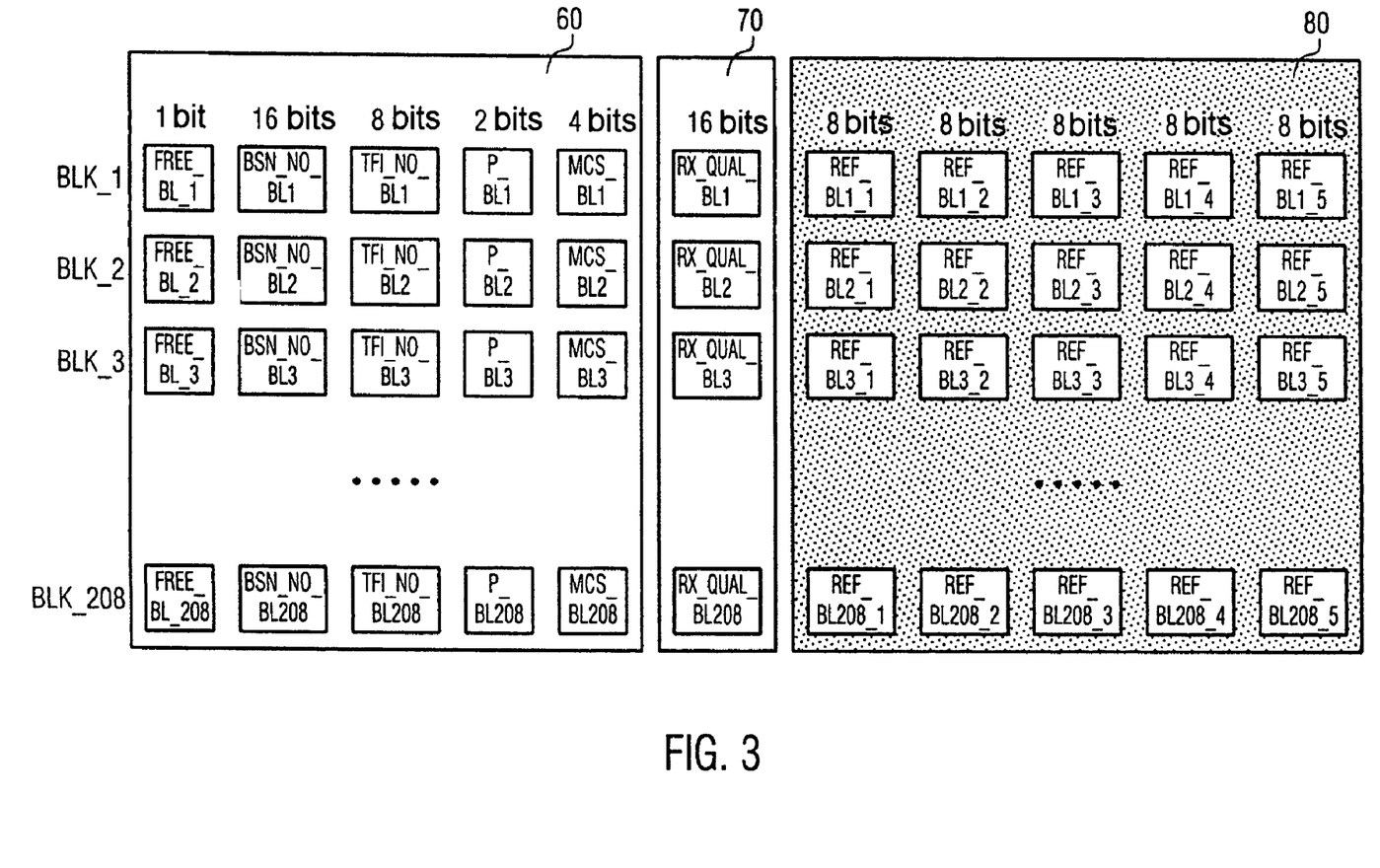
FIG. 3 shows the structure of a management information table.

By way of example, FIG. 3 shows a management information table such as is held in the management information table memory 50. The management information table is divided into three individual tables, namely the data block table 60, the quality value table 70 and the reference table 80.

The data block table 60 reflects the data content of the IR memory 40. That is to say, the data block table 60 contains an entry for each data block version stored in the IR memory 40. In the example illustrated here, 208 data block versions may be stored in positions BLK_1, BLK_2, . . . , BLK_208.

A first column having a width of 1 bit in the data block table 60 contains flags FREE_BL_1, . . . , FREE_BL_208 which indicate whether the associated memory position is occupied or free.

Each incoming data block version is assigned a number ("block number") which identifies the associated RLC data block and is indicated in the second column as the "BSN number" (Block Sequence Number) BSN_NO_BL1, BSN_NO_BL2, . . . , BSN_NO_BL208.

The TFI (Temporary Flow Identity) numbers TFI_NO_BL1, TFI_NO_BL2, . . . , TFI_NO_BL208 entered in the third column distinguish the "block flow" procedures to which the received data block belongs which are defined by the base station. The BSN number and the TFI number clearly identify a data block version stored in the IR memory 40.

The fourth column from the left specifies the puncturing pattern P_BL$_1$, P_BL2, . . . , P_BL208 used for the respective data block version. Since there are only three puncturing patterns P1, P2, P3, it is sufficient to code this entry using two bits.

The fifth column contains the modulation and coding schemes MCS_BL1, MCS_BL2, . . . , MCS_BL208 used for the individual data block versions. The nine different schemes MCS-1 to MCS-9 can be coded with a word length of 4 bits.

The quality value table 70 contains the quality values calculated by the unit 20 for all stored data block versions, denoted by RX_QUAL_BL1, RX_QUAL_BL2, . . . , RX_QUAL_BL208.

The entries in the reference table 80 specify the memory positions BLK_1, . . . , BLK_208 of data block versions which have the same BSN number. The reference table 80 can thus be used to ascertain those data block versions which have been transmitted (in the case of IR) with different MCS schemes and puncturing patterns, but otherwise have the same data information, i.e. are versions of one and the same RLC data block. By way of example, REF_BL7_1=57, REF_BL7_2=121, REF_BL7_3=191, REF_BL7_4=0, REF_BL7_5=0 means that data block versions having the same BSN number as the data block 7 are stored at memory positions BLK_57, BLK_121, BLK_191. An entry having the value 0 means that no data block version is referenced.

The reference table 80 thus makes it possible to find those data block versions which have been stored in the IR memory 40 for a data block which is to be transmitted during previous failed attempts. In the example illustrated here, data block versions may be referenced for five repeat transmissions of a data block. However, it is also possible to limit the number of data block versions to 2 using the method presented.

Figure 4:
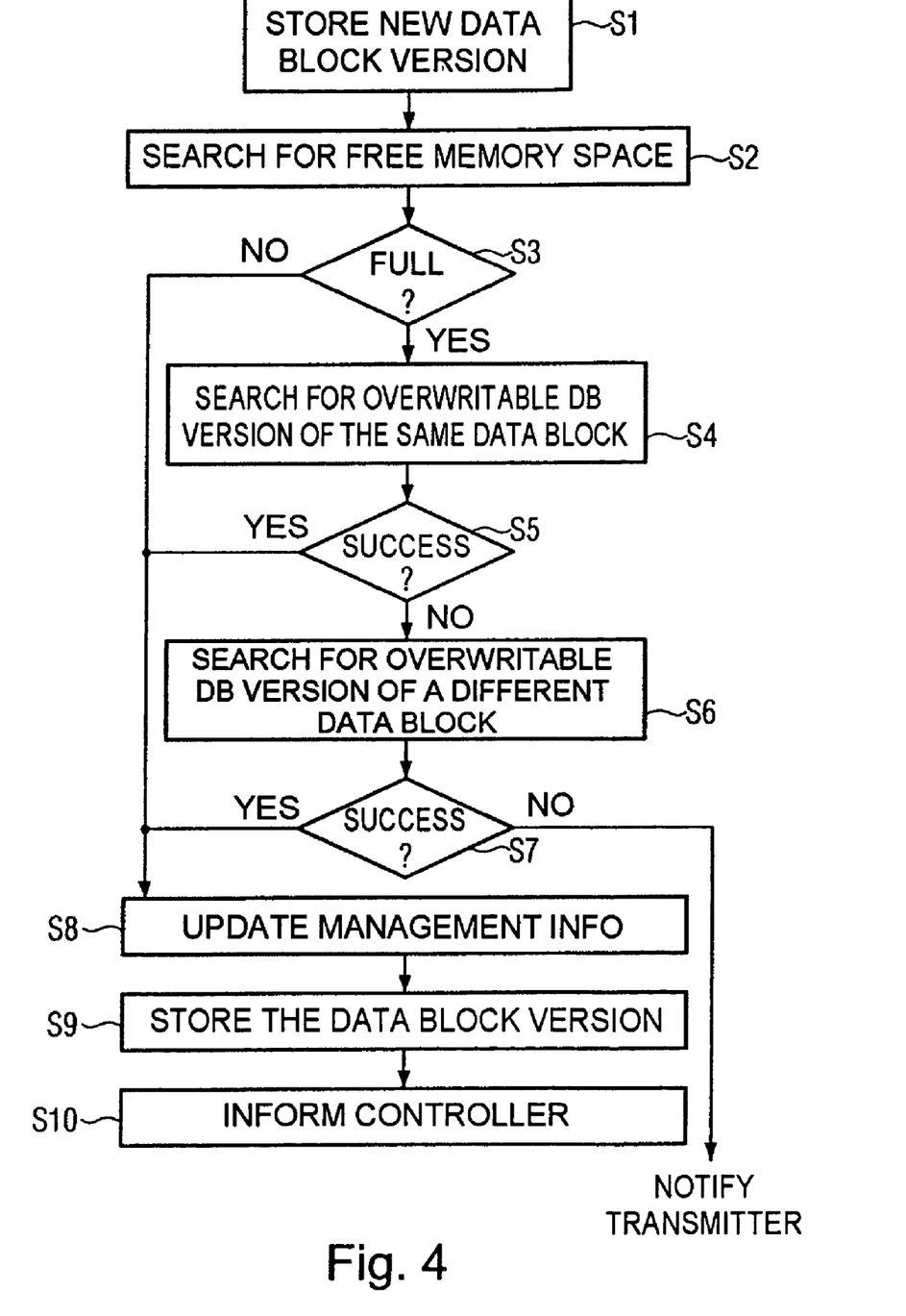
FIG. 4 shows a flowchart to explain the inventive method.

FIG. 4 shows the steps which need to be performed when a new data block version is to be stored in the IR memory 40 (step S1).

First, the management information is used to check whether there is a free memory space for storing the data block version. This is done by searching through the flags FREE_BL_1, ..., FREE_BL_208 in the data block table 60 (step S2) and checking whether the IR memory 40 is full (step S3).

If the IR memory 40 is not full, the process moves to step S8.

Otherwise, there is a search for an overwritable data block version of the same (RLC) data block. The search is performed using the reference table 80 and extends over all stored data block versions having the same BSN number as the current data block version.

If the search is successful, the process moves to step S8, in line with the step S5. Otherwise, there is a search for an overwritable data block version of a different (RLC) data block, see step S6. The search extends over all stored data block versions which, in line with the reference table 80, are associated with a different data block than the currently received data block version.

Step S6 is carried out only if step S4 was unsuccessful. If both steps S4 and S6 are still unsuccessful, the transmitter SE is sent a message indicating that the IR memory 40 in the receiver EM has overflowed. In this case, the transmission mode is slowed down.

If step S6 is successful, the process moves to step S8. In step S8, the management information tables 60, 70, 80 are updated by setting the flag (if IR memory 40 was not full) and entering the new BSN number, the new TFI number, the RX_QUAL value for the quality of the data block version which is to be stored, the puncturing pattern P, the modulation and coding scheme MCS and a reference in the reference table 80.

Next, the new data block version is stored in the IR memory 40 in step S9. In step S10, a controller controlling the overall flow is notified of the process carried out and particularly of the result of the searches S4 and S6.

Figure 5:
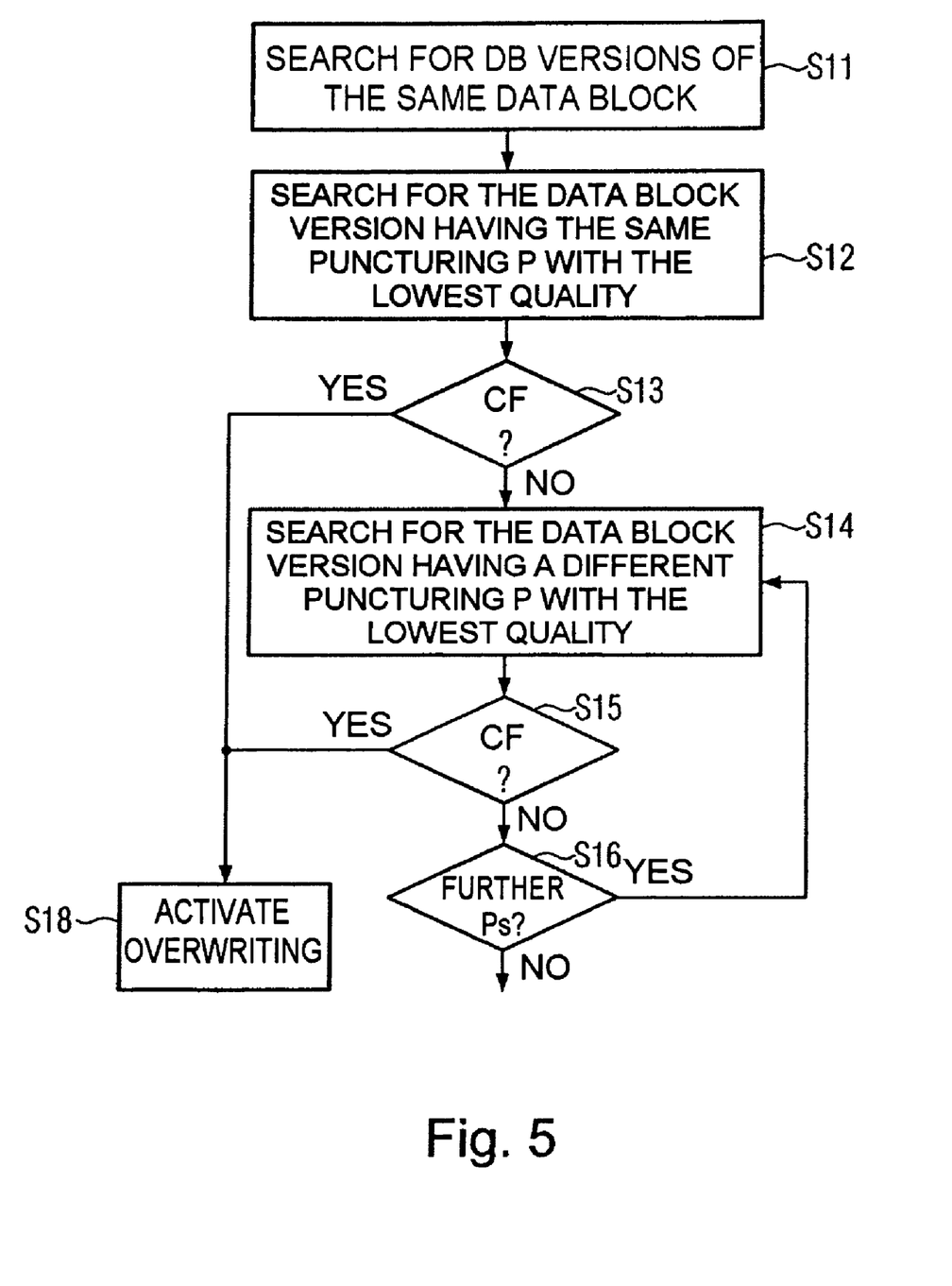
FIG. 5 shows a flowchart to explain the overwriting of a stored data block version by a received data block version in the same data block.

FIG. 5 gives a more detailed explanation of the search performed in step S4 for overwritable data block versions of the same data block.

In step S11, a search is performed for data block versions of the same data block. The search extends over stored data block versions having the same BSN number as the data block version which is to be stored. It is performed using the entries in the table 80.

In the next step S12, from these data block versions, that data block version having the same puncturing pattern P which has the lowest quality is ascertained. This is ascertained using the corresponding entries in the tables 60 and 70 of management information (see FIG. 3). The data block version found is denoted by BL_EMIN.

In step S13, the following inequality is checked:

$$RX\_QUAL(BL\_EMIN)+DIFF1<RX\_QUAL(BL\_AKT)$$

In this case, RX_QUAL(BL_EMIN) denotes the quality value of data block version BL_EMIN, RX_QUAL (BL_AKT) denotes the quality value of the current data block version BL_AKT and DIFF1 denotes a prescribable differential, which may also assume the value 0.

If the inequality is satisfied, write access to the IR memory 40 is activated in step S18 and the data block version BL_EMIN is overwritten by the current data block version BL_AKT.

Otherwise, the process moves to step S14. In step S14, a search is performed for that data block version having a different puncturing pattern P than the current data block version BL_AKT which has the lowest quality value.

The data block version found is denoted by BL_EMIN'. In step S15, a comparison is used to check whether the inequality $$RX\_QUAL(BL\_EMIN')+DIFF2<RX\_QUAL(BL\_AKT)$$

is satisfied. If this is the case, the process moves to step S18. Otherwise, the management information is used in step S16 to check whether the IR memory 40 contains data block versions punctured using yet other puncturing patterns P. If this is the case, steps S14, S15 and S18 or S16 are repeated.

The values DIFF1 and DIFF2 may be dependent on the modulation and coding schemes MCS-1, ..., MCS-9 of the data block versions BL_EMIN or BL_EMIN' and BL_AKT which are to be compared. On account of the information obtained when combining data block versions from different puncturing schemes, it holds that DIFF2>DIFF1.

Figure 6:
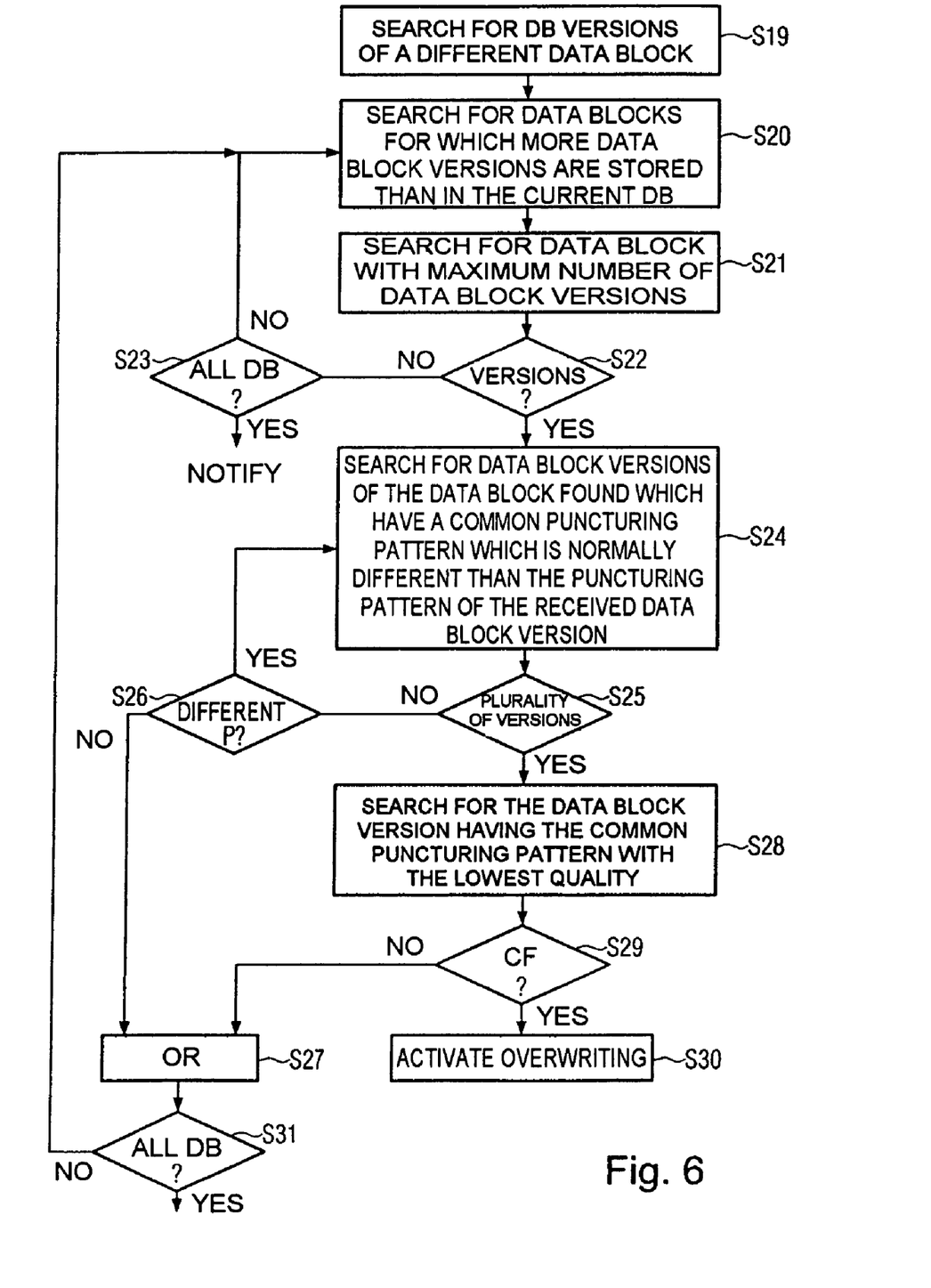
FIG. 6 shows a flowchart to explain the overwriting of a stored data block version by a received data block version in a different data block.

FIG. 6 shows the procedure for the search, to be carried out in step S6, for overwritable data block versions of a different data block (step S19).

In step S20, the information in the reference table 80 is used to search for the data blocks for which there are respectively more stored data block versions in the IR memory 40 than for the data block to which the current data block version BL_AKT can be attributed.

Next, the data blocks found are searched for that data block having the maximum number of stored data block versions (step S21).

In step S22, a check is carried out to determine whether the number of versions of the data block found is greater than the number of versions of the current data block.

If this is not the case, the process moves to step S23. In step S23, a check is carried out to determine whether all data blocks for which a data block version is stored in the IR memory 40 have been checked. If this is not the case, step S20 is repeated. Otherwise, the transmitter SE is notified that the IR memory 40 is overflowing, whereupon the transmitter SE slows down the transmission of data blocks.

If step S22 was successful, a search for the multiple occurrence of a common puncturing pattern within the data block versions found is performed in step S24. The search extends over the data blocks found in step S21 (i.e. the associated BSN and TFI numbers of the management information). A check is carried out to determine whether there are a plurality of data block versions of the data block found which have a common puncturing pattern P1 or P2 or P3 within a modulation and coding scheme MCS-1, ..., MCS-9. The common puncturing pattern P1, P2, P3 has nothing to do with the puncturing pattern of the other data block's data block version which is to be stored.

In step S25, a check is carried out to determine whether a plurality of data block versions for a common puncturing pattern P has been found in step S24. If this is not the case, a check is carried out in step S26 to determine whether all available puncturing patterns have been checked. A test is then performed to determine whether a plurality of data block versions of the data block found for a different common puncturing pattern are available in the IR memory 40. If this is the case, the process returns to step S24. Otherwise, the process moves to step S27.

If it is established in step S25 that there are a plurality of data block versions having a common puncturing pattern which are stored for the data block having the maximum number of data block versions, then in step S28 there is a search for that data block version having the common puncturing pattern which has the lowest quality value.

In step S29, a check is carried out to determine whether the inequality $$RX\_QUAL(BL\_EMIN") + DIFF3 < RX\_QUAL(BL\_AKT)$$

is satisfied. In this case, BL_EMIN" denotes the data block version found in step S28, and DIFF3 denotes a prescribable difference value, which may also be 0.

If the inequality is satisfied, then overwriting of the data block version found in step S28 is activated in step S30. Otherwise, the process moves to step S27.

In step S27, logic ORing is performed, i.e. the process arrives at step S31 either from step S26 or step S29. In step S31, a check is carried out to determine whether all data blocks have been covered in the search performed in step S20. If this was not the case, the process returns to step S20. Otherwise, the transmitter SE is notified that the IR memory 40 is overflowing and therefore the data transmission needs to be slowed down.

The size of the IR memory 40 may be proportioned such that no more than, by way of example, two data block versions are stored in the IR memory 40 for each data block on average over time. For EGPRS, a reduction in memory of, on average, no more than 3 stored data block versions per data block is achieved in comparison with the prior art. In practice, it is possible to reduce the IR memory 40 by between several 1000 and approximately 10,000 data words having a word length of 16 bits.

I claim:

1. A method for managing data block versions obtained from repeat transmissions of a data block which is to be decoded in a receiver, the data block to be transmitted being subjected to channel coding and puncturing in the transmitter, comprising:
   providing a memory area for storing received data block versions in punctured form; and
   making a decision regarding whether or not a received data block version for a data block whose decoding in the receiver has failed to date and is also unsuccessful when the received data block version is taken into account is stored as a punctured data block version in the memory area,
   wherein the decision to be made regarding the storage or nonstorage of a received data block version is made on the basis of management information which is held in the receiver for the punctured data block versions stored in the memory area, the management information comprising information about the quality of a stored data block version,
   wherein the quality of the received data block version is determined, and
   wherein a stored data block version of a first data block can be overwritten by the received data block version of a second data block only if:
      more data block versions are stored for the first data block than for the second data block, the first data block has a plurality of data block versions having one and the same puncturing pattern Px, which is different to the puncturing pattern of the received data block version, and
      the quality of the received data block version is a prescribed amount better than the quality of a stored data block version having the puncturing pattern Px.

2. The method as claimed in claim 1, wherein data block versions stored in the memory area for the same data block can be channel coded using a different channel code and/or can be punctured using a different puncturing pattern.

3. The method as claimed in claim 1, wherein the management information also comprises information for referencing further stored data block versions for the same data block.

4. The method as claimed in claim 1, wherein the management information also comprises information which indicates the channel code used and/or the puncturing pattern used.

5. The method as claimed in claim 1, wherein the management information also comprises information which indicates the data block to which the stored data block version can be attributed.

6. The method as claimed in claim 1, wherein storing a received data block version involves overwriting an already stored data block version, the stored data block version to be overwritten being chosen on the basis of the management information.

7. The method as claimed in claim 1, further comprising:
   storing a received data block version if free memory space is available;
   otherwise
   making a decision regarding whether the received data block version can be stored by over-writing a data block version of the same data block;
   if this is not possible,
   making a decision regarding whether the received data block version can be stored by over-writing a data block version of a different data block;
   otherwise
   rejecting the received data block version.

8. The method as claimed in claim 1, wherein no more than a particular prescribed number of received punctured data block versions, particularly two, can be stored on average over time for each data block.

9. The method as claimed in claim 1, wherein
   the quality of the received data block version is determined, and
   a stored data block version can be overwritten by the received data block version associated with the same data block only if a comparison between the quality of the received data block version and the quality of the stored data block version reveals that the quality of the received data block version is a prescribed differential better than the quality of the stored data block version.

10. The method as claimed in claim 9, wherein
    the differential assumes a first prescribed difference value if the received data block version and the stored data block version have been punctured using the same puncturing pattern,
    the differential assumes a second prescribed difference value if the received data block version and the stored data block version have been punctured using different puncturing patterns, and
    the second prescribed difference value is greater than the first prescribed difference value.

11. The method as claimed in claim 1, wherein
    the first data block selected is that data block for which most data block versions are stored in the memory area, and
    this first data block's stored data block version to be overwritten which is selected is that data block version punctured using the puncturing pattern Px which has the poorest quality.

12. The method as claimed in claim 1, wherein the method is used for transmitting data blocks based on the EGPRS standard.

13. An apparatus for managing data block versions obtained from repeat transmissions of a data block which is to be decoded in a receiver, the data block to be transmitted being subjected to channel coding and puncturing in the transmitter, comprising:
  a memory area configured to store received data block versions in punctured form, and
  a decision logic unit configured to decided whether or not a received data block version for a data block whose decoding in the receiver has failed to date and is also unsuccessful when the received data block version is taken into account is stored as punctured data block version in the memory area,
  wherein the decision logic unit decides whether to store or not store a received data block version on the basis of management information which is held in the receiver for the punctured data block versions stored in the memory area, the management information comprising information about the quality of a stored data block version,
  wherein the quality of the received data block version is determined, and
  wherein a stored data block version of a first data block can be overwritten by the received data block version of a second data block only if:
    more data block versions are stored for the first data block than for the second data block, the first data block has a plurality of data block versions having one and the same puncturing pattern Px, which is different to the puncturing pattern of the received data block version, and
    the quality of the received data block version is a prescribed amount better than the quality of a stored data block version having the puncturing pattern Px.

14. The apparatus as claimed in claim 13, wherein data block versions stored in the memory area for the same data block can be channel coded using a different channel code and/or can be punctured using a different puncturing pattern.

15. The apparatus as claimed in claim 13, comprising a management information table which is associated with the memory area and contains the management information for each stored punctured data block version, the table comprising an entry for information about the quality of the data block version.

16. The apparatus as claimed in claim 15, wherein the management information table also comprises an entry for information for referencing further stored data block versions for the same data block.

17. The apparatus as claimed in claim 15, wherein the management information table also comprises an entry for information which indicates the channel code used and/or the puncturing pattern used.

18. The apparatus as claimed in claim 15, wherein the management information table also comprises an entry for information which indicates the data block to which the stored data block version can be attributed.

19. The apparatus as claimed in claim 15, wherein the decision logic unit accesses entries in the management information table and makes its decision on the basis of the management information obtained.

20. The apparatus as claimed in claim 13, wherein the decision logic unit decides to store a received data block version in a free memory space if such a memory space is available, otherwise it decides whether the received data block version is to be stored by overwriting a data block version of the same data block, and if the result of this decision is negative it decides whether the received data block version can be stored by overwriting a data block version of a different data block, with a decision being made to reject the received data block version if the result of this decision is also negative.

21. The apparatus as claimed in claim 13, wherein the size of the memory area has been chosen such that no more than a particular prescribed number of received punctured data block versions, particularly two, can be stored for each data block on average over time.

22. The apparatus as claimed in claim 13, wherein the decision logic unit comprises:
  a means for selecting a stored data block version,
  a means for calculating a quality difference between the quality of the received data block version and the quality of the selected stored data block version, which is taken from the management information table, and
  a means for assessing the quality difference.

23. A method for managing data block versions obtained from repeat transmissions of a data block which is to be decoded in a receiver, the data block to be transmitted being subjected to channel coding and puncturing in the transmitter, comprising:
  providing a memory area for storing received data block versions in punctured form;
  determining a quality value for a received data block version;
  storing said received data block version for a data block whose decoding in the receiver has failed to date and is also unsuccessful when the received data block version is taken into account as a punctured data block version in the memory area if said quality value is greater than a predetermined value and not storing said data block version otherwise,
  wherein the decision to be made regarding the storage or nonstorage of a received data block version is made on the basis of management information which is held in the receiver for the punctured data block versions stored in the memory area, the management information comprising information about the quality of a stored data block version,
  wherein the quality of the received data block version is determined, and
  wherein a stored data block version of a first data block can be overwritten by the received data block version of a second data block only if:
    more data block versions are stored for the first data block than for the second data block; the first data block has a plurality of data block versions having one and the same puncturing pattern Px, which is different to the puncturing pattern of the received data block version, and
    the quality of the received data block version is a prescribed amount better than the quality of a stored data block version having the puncturing pattern Px.

24. The method according to claim 23, wherein the quality value is calculated from soft output values of an equalizer connected upstream in a signal path in the receiver.

* * * * *

UNITED STATES PATENT AND TRADEMARK OFFICE
CERTIFICATE OF CORRECTION

PATENT NO.       : 8,078,808 B2  
APPLICATION NO.  : 10/975760  
DATED            : December 13, 2011  
INVENTOR(S)      : Burkhard Becker Page 1 of 1

It is certified that error appears in the above-identified patent and that said Letters Patent is hereby corrected as shown below:

Title Page

Under section (30) FOREIGN APPLICATION PRIORITY DATA please delete "Apr. 29, 2003" and insert -- Apr. 29, 2002. --, therefor.

Signed and Sealed this  
Twentieth Day of March, 2012

David J. Kappos  
*Director of the United States Patent and Trademark Office*